United States Patent
Tilev et al.

(10) Patent No.: US 7,410,569 B1
(45) Date of Patent: Aug. 12, 2008

(54) FILTRATION SYSTEM FOR METALWORKING FLUIDS

(75) Inventors: Turhan A. Tilev, 559 Forest Ave., Glen Ellyn, IL (US) 60137; John Wayne Nowicki, West Chicago, IL (US); Kenneth Frederick Packer, Naperville, IL (US)

(73) Assignee: Turhan A. Tilev, Glen Ellyn, IL (US)

( * ) Notice: Subject to any disclaimer, the term of this patent is extended or adjusted under 35 U.S.C. 154(b) by 259 days.

(21) Appl. No.: 11/164,339

(22) Filed: Nov. 18, 2005

(51) Int. Cl.
*B01D 29/52* (2006.01)
*B01D 29/66* (2006.01)
*B01D 21/04* (2006.01)

(52) U.S. Cl. .............................. 210/167.02; 210/172.2; 210/172.3; 210/299; 210/305; 210/323.1; 210/333.01; 210/411; 210/416.5; 210/499; 210/521; 210/526

(58) Field of Classification Search ................... None
See application file for complete search history.

(56) References Cited

U.S. PATENT DOCUMENTS

| | | | |
|---|---|---|---|
| 32,135 A | 4/1861 | Jones | |
| 2,024,426 A | 12/1935 | Butler | |
| 2,371,895 A * | 3/1945 | Kingman | 210/457 |
| 2,401,340 A * | 6/1946 | Dunmire et al. | 72/42 |
| 2,457,449 A | 12/1948 | Davis et al. | |
| 2,468,296 A | 4/1949 | Jacobowitz et al. | |
| 2,494,534 A | 1/1950 | Armstrong et al. | |
| 2,555,724 A | 6/1951 | Woody et al. | |
| 2,887,228 A | 5/1959 | Harlan et al. | |
| 2,895,883 A * | 7/1959 | Hobson | 196/46 |
| 3,074,561 A | 1/1963 | Mummert | |
| 3,168,470 A | 2/1965 | Rhoda | |
| 3,206,034 A | 9/1965 | Anderson | |
| 3,291,312 A | 12/1966 | Peterson et al. | |
| 3,491,887 A | 1/1970 | Maestrelli | |
| 3,542,205 A | 11/1970 | O'Cheskey | |
| 3,557,959 A | 1/1971 | Muller | |
| 3,585,133 A | 6/1971 | Honan et al. | |
| 3,643,803 A | 2/1972 | Glos, II | |
| 3,679,062 A | 7/1972 | Burkhart | |

(Continued)

FOREIGN PATENT DOCUMENTS

CH 307619 8/1955

(Continued)

OTHER PUBLICATIONS

Nehls, Barry L; and Cross, Gale V. Society of Manufacturing Engineers Report MR93-138; "Microscreen Filtration of Metalworking Fluids"; Copyright 1993.

*Primary Examiner*—Robert James Popovics
(74) *Attorney, Agent, or Firm*—Dickinson Wright PLLC (57) ABSTRACT

A filtration system for metalworking fluids has panel filter elements arranged in cells in which the filter frames and panels are approximately parallel to one another. The filter frames are disposed such that the filter surfaces are oriented at an acute angle with respect to the longitudinal axis of the drag-out tank within which they are installed. The filter elements are constructed by affixing a microscreen filter to a wire mesh support structure. The wire mesh structure provides as much support as the perforated plates of the prior art, while featuring significant gains in effective filter area when compared with perforated plate constructions.

9 Claims, 9 Drawing Sheets

U.S. PATENT DOCUMENTS

| | | | |
|---|---|---|---|
| 3,692,181 A | 9/1972 | Davis | |
| 3,727,762 A | 4/1973 | Padovan | |
| 3,750,847 A * | 8/1973 | Sluhan | 184/109 |
| 3,780,872 A | 12/1973 | Pall | |
| 3,784,019 A | 1/1974 | Gordon, II | |
| 3,879,286 A | 4/1975 | Berriman | |
| 3,897,335 A * | 7/1975 | Brandt | 210/774 |
| 3,935,105 A * | 1/1976 | McEwen | 210/138 |
| 3,948,779 A | 4/1976 | Jackson | |
| 3,954,611 A * | 5/1976 | Reedy | 210/695 |
| 3,984,044 A | 10/1976 | Breton et al. | |
| 4,071,451 A | 1/1978 | Wood | |
| 4,139,472 A | 2/1979 | Simonson | |
| 4,159,951 A | 7/1979 | Davis | |
| 4,169,059 A | 9/1979 | Storms | |
| 4,234,430 A | 11/1980 | Peer et al. | |
| 4,325,663 A * | 4/1982 | Lee | 409/136 |
| 4,329,064 A | 5/1982 | Mann et al. | |
| 4,394,272 A | 7/1983 | Damerau | |
| 4,396,506 A | 8/1983 | Damerau | |
| 4,404,101 A | 9/1983 | Koch et al. | |
| 4,427,554 A | 1/1984 | Busse et al. | |
| 4,428,838 A | 1/1984 | Creps et al. | |
| 4,547,288 A | 10/1985 | Little | |
| 4,643,827 A | 2/1987 | Becker | |
| 4,673,502 A | 6/1987 | Fox | |
| 4,737,176 A | 4/1988 | Lippert et al. | |
| 4,751,006 A | 6/1988 | Becker | |
| 4,761,226 A | 8/1988 | Creps | |
| 4,790,935 A | 12/1988 | Johnson | |
| 4,829,766 A | 5/1989 | Henkel | |
| 4,844,794 A | 7/1989 | Ziller | |
| 4,872,997 A | 10/1989 | Becker | |
| 4,985,146 A | 1/1991 | Fox et al. | |
| 5,004,540 A | 4/1991 | Hendricks | |
| 5,008,009 A | 4/1991 | Ciaffoni | |
| 5,032,272 A | 7/1991 | Mould | |
| 5,069,791 A | 12/1991 | Becker et al. | |
| 5,101,936 A | 4/1992 | Paredes et al. | |
| 5,104,529 A | 4/1992 | Becker | |
| 5,200,072 A | 4/1993 | Frejborg et al. | |
| 5,221,469 A | 6/1993 | Nehls | |
| 5,230,793 A * | 7/1993 | Lenhart et al. | 210/167.31 |
| 5,243,632 A | 9/1993 | Badin et al. | |
| 5,262,071 A * | 11/1993 | Tuck | 210/805 |
| 5,279,734 A | 1/1994 | Nehls | |
| 5,380,446 A * | 1/1995 | Bratten | 210/805 |
| 5,399,265 A | 3/1995 | Nehls | |
| 5,453,184 A | 9/1995 | Handtmann | |
| 5,466,380 A * | 11/1995 | Bratten | 210/741 |
| 5,593,596 A * | 1/1997 | Bratten | 210/741 |
| 5,632,891 A | 5/1997 | Krasicky, Jr. | |
| 5,637,216 A | 6/1997 | Dillier | |
| 5,645,382 A * | 7/1997 | Homanick et al. | 409/131 |
| 5,718,196 A | 2/1998 | Uchiyama et al. | |
| 5,800,104 A * | 9/1998 | Miyano | 409/131 |
| 5,858,218 A * | 1/1999 | Setlock et al. | 210/167.01 |
| 5,874,008 A * | 2/1999 | Hirs | 210/708 |
| 5,975,108 A * | 11/1999 | Cho | 137/205 |
| 5,975,312 A | 11/1999 | Bonsan | |
| 6,017,446 A * | 1/2000 | Harms et al. | 210/167.02 |
| 6,096,198 A * | 8/2000 | Underhill | 210/123 |
| 6,110,386 A * | 8/2000 | Underhill | 210/744 |
| 6,126,099 A * | 10/2000 | Fachinger et al. | 241/81 |
| 6,162,355 A * | 12/2000 | Mizuno et al. | 210/167.02 |
| 6,169,045 B1 | 1/2001 | Pike et al. | |
| 6,235,209 B1 * | 5/2001 | Bratten | 210/784 |
| 6,355,167 B1 * | 3/2002 | Wensauer | 210/232 |
| 6,508,944 B1 * | 1/2003 | Bratten | 210/805 |
| 6,571,959 B1 * | 6/2003 | Moore et al. | 210/394 |
| 6,911,142 B2 * | 6/2005 | Pahl et al. | 210/167.01 |
| 7,172,689 B2 * | 2/2007 | Bratten | 210/137 |
| 7,258,784 B2 * | 8/2007 | O'Ryan et al. | 210/108 |
| 7,338,606 B2 * | 3/2008 | Bratten | 210/741 |
| 2004/0251216 A1 * | 12/2004 | O'Ryan et al. | 210/767 |

FOREIGN PATENT DOCUMENTS

| | | |
|---|---|---|
| DE | 732135 | 2/1943 |
| DK | 74132 C | 4/1952 |
| FR | 818227 | 9/1937 |
| SU | 698635 | 11/1979 |

* cited by examiner

*Prior Art*

FILTRATION SYSTEM FOR METALWORKING FLUIDS

BACKGROUND OF THE INVENTION

This invention relates generally to a filtration system adapted for industrial application, and in particular to a filtration system and automatic settling tank combination designed to remove industrial contaminants, and is more particularly directed toward a filtering system adapted to remove particulates from recirculated fluids used in the metalworking industry for metalworking processes.

DISCLOSURE INFORMATION

It is often necessary in metalworking operations to provide a lubricating fluid at the junction between workpiece and tool. In addition to a lubricating action, the fluid acts to cool both the workpiece and tool to prevent overheating, aids in protecting the workpiece and machine components from corrosion, and also carries away the metal chips and other byproducts of the process away from the work area.

In most large-scale metalworking facilities, it is common practice to consolidate fluid delivery systems into centralized units. This approach consistently provides fluid at specified concentration, temperature, and pressure to each machine tool, yielding an economical means for meeting present day demands for ever tighter tolerances and finishes on machined components.

Due to the initial purchase cost of the fluids, the cost of disposal when rendered unusable, and the environmental consequences of disposal, metalworking facilities are inherently motivated to maximize the useful life of these fluids. One of the main prerequisites for fluid longevity is the filtration performance delivered by the design of these central systems. In order to facilitate optimum fluid life, chips and particulate contamination in the fluid must be removed. Metal chips and particles in the fluid will interfere with proper recirculation and promote undesirable biological activity, and these contaminants in the fluid would have an adverse effect on both tools and workpieces if an attempt were made to recirculate this unfiltered fluid.

Consequently, a need arises for an effective filtering system for machine tool environments that features high performance filter materials and an optimum arrangement of elements providing ease of servicing and replacement without loss of production time.

SUMMARY OF THE INVENTION

These needs and others are satisfied by the filtration system of the present invention, in which a plurality of frames of filter elements are arranged in cells in which the filter surfaces of each member frame are approximately parallel to one another. The cell is disposed such that the filter surfaces of each member frame are oriented at an acute angle with respect to the longitudinal axis of the drag-out tank within which they are installed.

The filter elements adapted for use in the system of the present invention are constructed by affixing a microscreen filter to a wire mesh support structure. The wire mesh structure provides as much support as the perforated plates of the prior art, while featuring significant gains in effective filter area when compared with the perforated plate embodiment.

Further objects, features, and advantages of the present invention will become apparent from the following description and drawings.

DETAILED DESCRIPTION OF THE INVENTION

Figure 1:
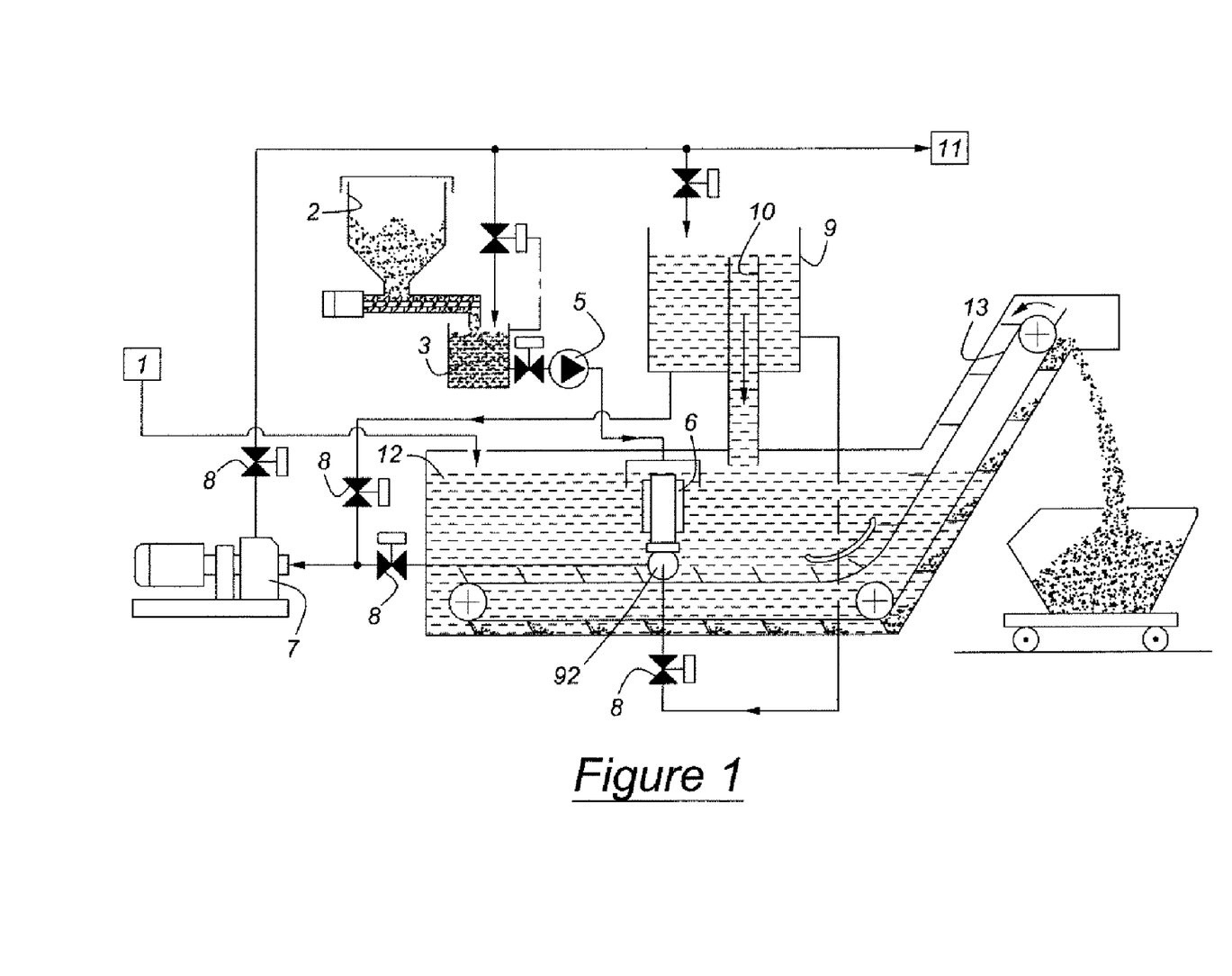
FIG. 1 is a schematic view of a filtration system suitable for use with metalworking fluids according to the present invention.

FIG. 1 illustrates a metalworking fluid filtration system according to the present invention. Contaminated fluid from the machine tools on the shop floor is delivered to the system through inlet pipe 1. The fluid is dropped into drag-out tank 12 where the shavings, particulates, and heavy contaminants settle, and are eventually removed by drag conveyor 13. As described below, particulate contaminants that stay suspended due to size and level of turbulence are captured by a microscreen filter and the filter matrix formed on the microscreen.

The heart of the filtration process is filter 6, which will be discussed in more detail subsequently. The microfiltration action is generally enhanced by a filter aid (such as powdered cellulose, perlite, or diatomaceous earth, for example) that is stored in bin 2, and dropped into slurry tank 3 at the beginning of each filtration cycle through a volumetric feeder. The filter aid is delivered to the filter 6 by a slurry pump 5, and acts to form a matrix "filter cake" which captures suspended contaminants. When no longer effective, the filter cake is removed from the surface of filter 6 by backflushing, and allowed to drop to the bottom of the drag-out tank 12. Fragments of filter cake are removed from the drag-out tank 12 by conveyor system 13, which is interlocked to operate intermittently when the filter element 6 is backflushed, separating the spent filter cake laden with captured particles. System pump 7 provides clean fluid for recirculation to the shop floor through outlet pipe 11.

In order that the periodic backflushing cycles will not interfere with delivery of clean fluid, auxiliary clean tank 9 is provided. Auxiliary clean tank 9 includes an overflow provision 10 to maintain system balance. When filter backflushing is in progress, system valves 8 are configured to draw clean fluid from auxiliary clean tank 9 instead of from filter 6.

Figure 2:
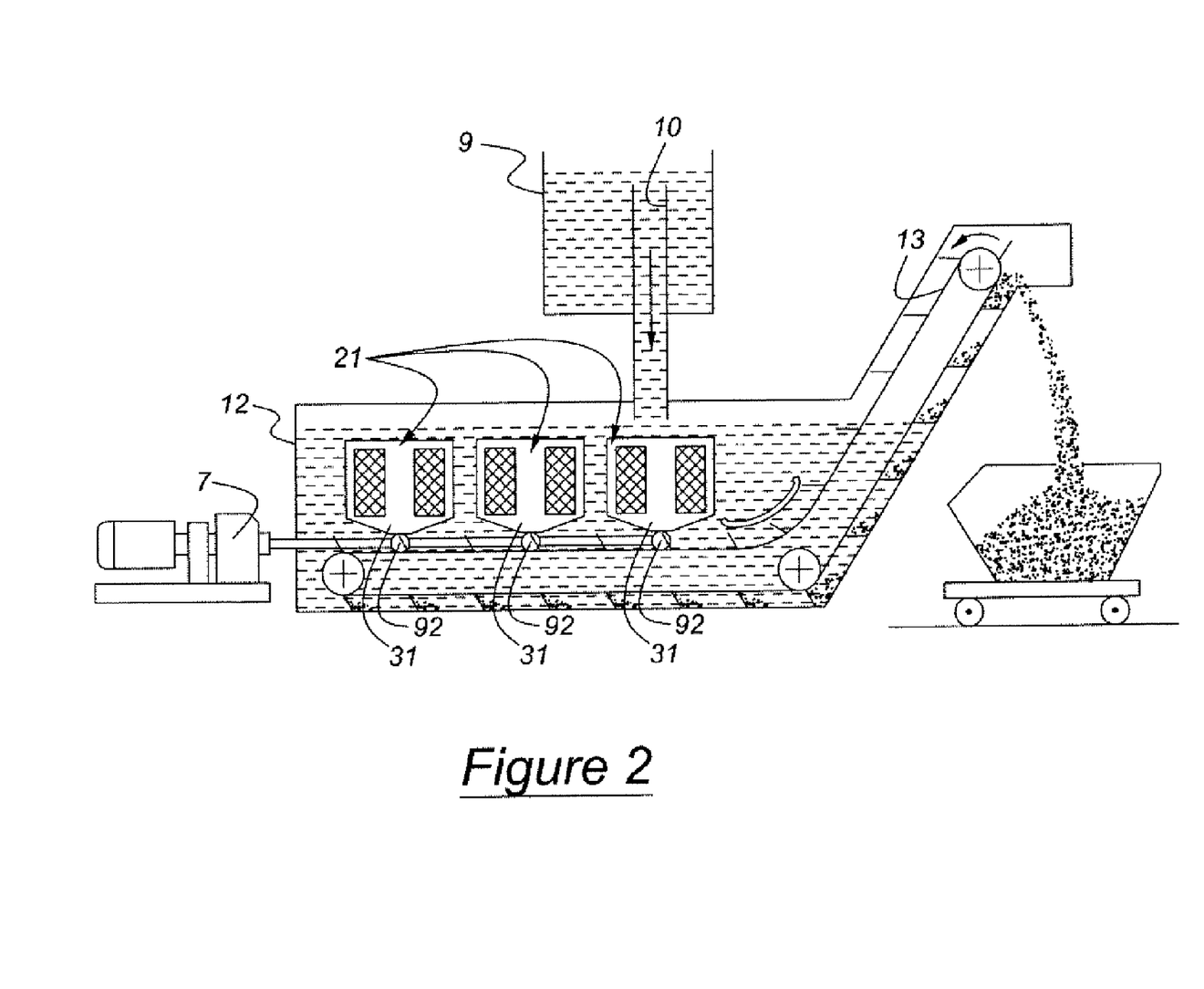
FIG. 2 is a cutaway side view of a drag-out tank illustrating an arrangement of filter cells in accordance with the present invention.
Figure 3:
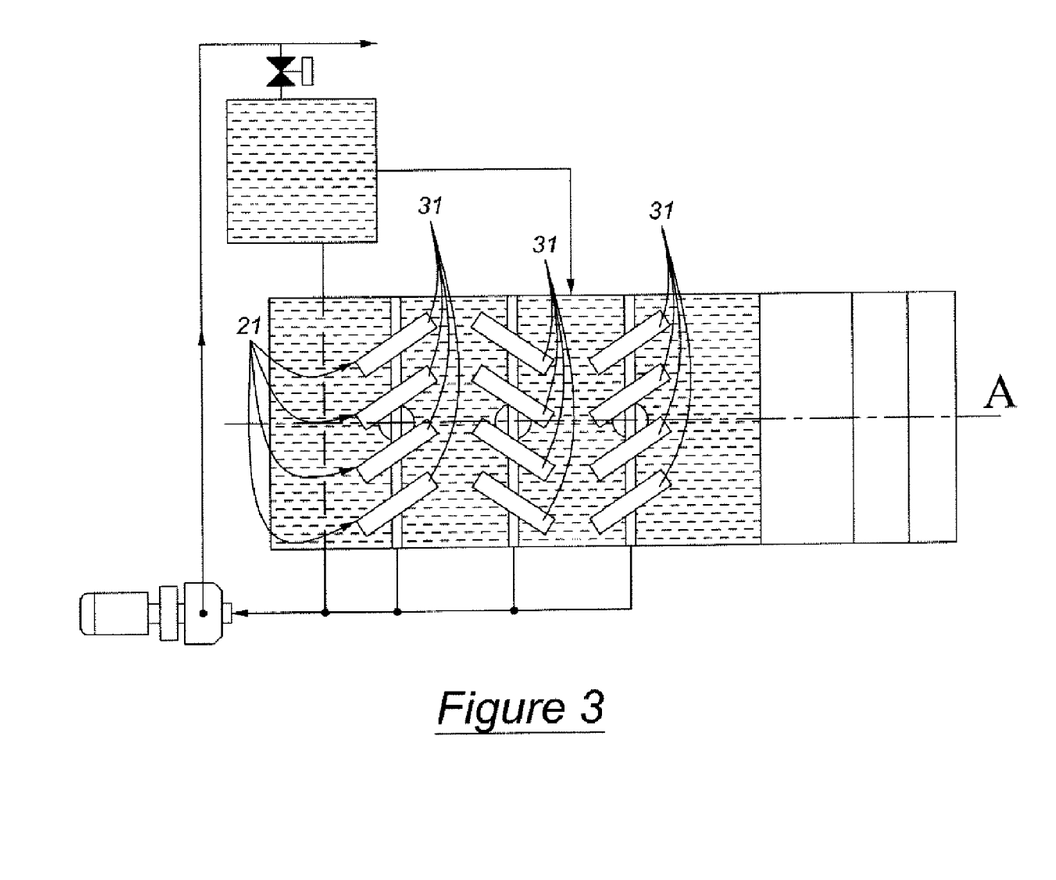
FIG. 3 is a top view of a filter system illustrating the arrangement of the filter frames in an exemplary cell embodiment of the present invention.

FIG. 2 is a cutaway side view of a drag-out tank 12 illustrating filter 6 of FIG. 1 as an arrangement of filter cells 21 atop suction headers 92 in accordance with the present invention. FIG. 3 is a top view of a filter system illustrating the arrangement of filter frames 31 in an exemplary cell embodiment. As can be appreciated from an examination of FIGS. 2 and 3, a system in accordance with the present invention contemplates disposing a plurality of filter frames 31 to form cells 21 in which each frame 31 of a cell 21 is arranged approximately parallel to the other frames 31 in the cell 21, and the frames 31 themselves are disposed such that the filter surfaces of the frames 31 are aligned at an angle of approximately 45 degrees with respect to longitudinal axis A of drag-out tank 12. This orientation of frames 31 produces a two-fold beneficial effect. In the first instance, the parallel relationship between the frames in each cell allow a much greater total filter surface area. Moreover, the movement of conveyor 13 agitates the dirty coolant and causes the coolant to flow along the filter panels, while promoting the settling of contaminants on the floor of the tank, rather than upon the filters. This promotes efficient filtration. The present filter system is much more efficient than that disclosed in U.S. Pat. No. 5,221,469, which uses star-shaped filtration modules which are more prone to uneven exposure and buildup of dirt upon the filter panels, with a corresponding loss of filtration efficiency.

Figure 4:
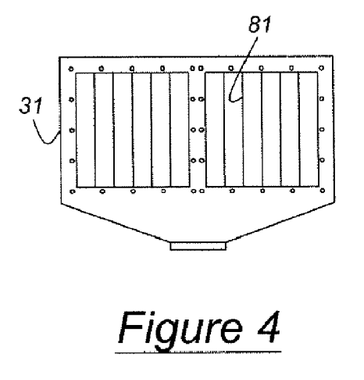
FIG. 4 is an elevational view of a filter frame according to the present invention.
Figure 5:
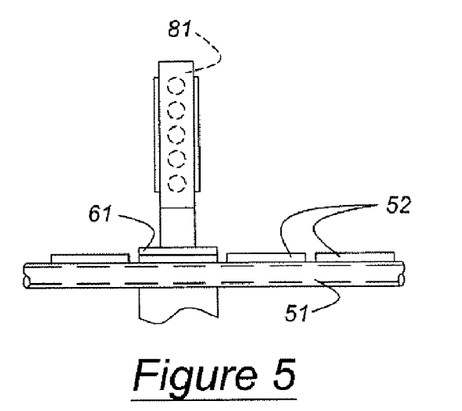
FIG. 5 depicts a stylized cutaway view of a single filter frame.
Figure 6:
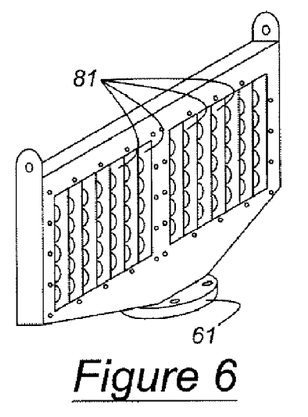
FIG. 6 shows the frame of FIG. 4 in perspective view.

FIG. 4 is an elevational view of frame 31, while FIG. 6 shows frame 31 in perspective, along with placement of internally disposed support plates 81 which provide structural integrity and internal support for the filter elements themselves, which will be discussed in greater detail below. FIG. 6 also illustrates the mounting flange 61 designed for attachment to the receiver 51 of FIG. 5. FIG. 5 depicts a stylized cutaway view of a single frame 31, exposing support plate 81 placement, as well as illustrating the mating flanges 52 disposed along the receiver 51 to support the remaining frames of filtration cell 21.

Figure 7:
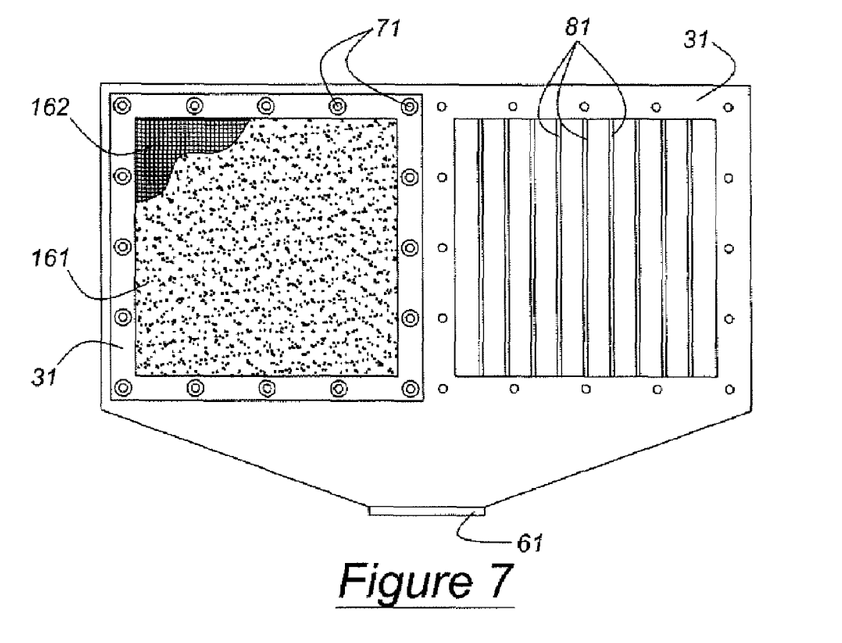
FIG. 7 is an enlarged elevational view of a single filter frame illustrating a preferred mounting method for the filter elements onto the frame.
Figure 8:
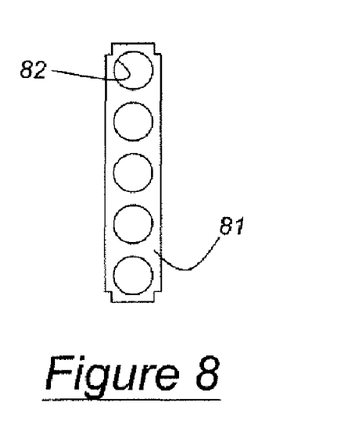
FIG. 8 provides a detail view of a filter support plate.

FIG. 7 is an enlarged elevational view of a single frame 31 illustrating a preferred mounting method for the filter elements onto the frame. Filter elements 161 and 162 are placed in position over support plates 81 and secured in position with bolts 71 that are run through a bezel 72 into threaded mounting holes in frame 31. FIG. 8 provides a detail view of support plate 81, preferably constructed from stainless steel, and including a plurality of openings 82 disposed along it. The openings 82 ensure that the support plate will provide the required support for the filter elements themselves, but will not interfere with fluid flow within the frame. Note that fluid need not flow through openings 82 in order to be filtered.

Figure 9:
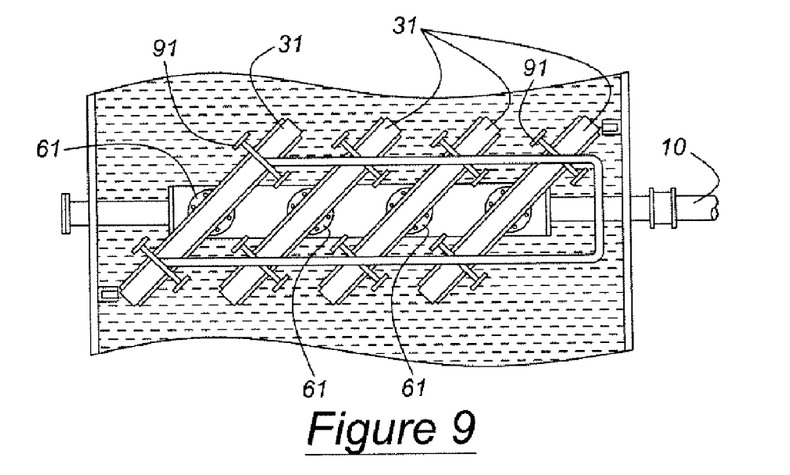
FIG. 9 in a top view of a portion of a drag-out tank more closely illustrating the orientation of the filter frames of a cell with respect to the tank's longitudinal axis, and the orientation of the pipe network for delivery of a filter aid powder.
Figure 10:
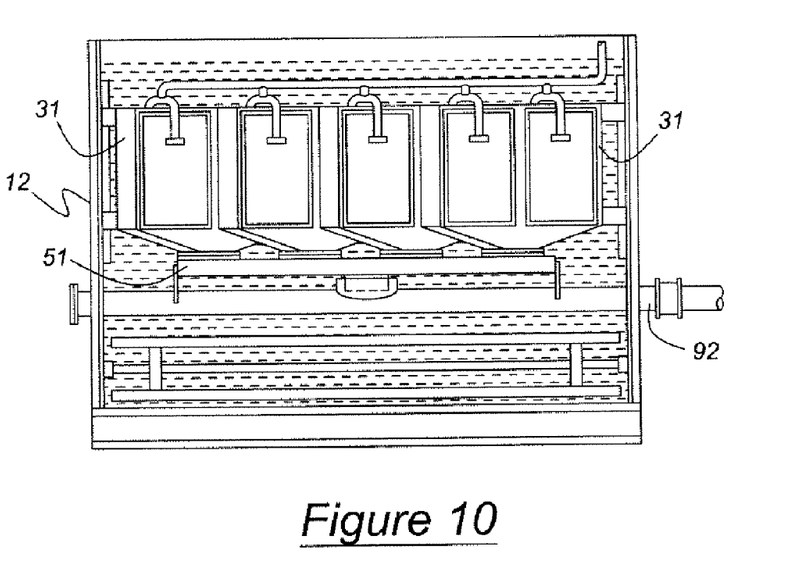
FIG. 10 is an elevational view in cut-away that illustrates filter frame installation to a receiver.

FIG. 9 is a top view of a portion of the drag-out tank 12 more closely illustrating the orientation of the frames 31 with respect to the longitudinal axis of drag-out tank 12. Also visible in this view are the delivery nozzles 91 for the filter aid. FIG. 10 is an elevational view in cut-away that illustrates frame installation to the collector (or receiver) 51, as well as the connection of the receiver 51 to the suction header 92. Control valves can isolate an individual suction header 92 so that a cell can be removed without affecting system operation.

Figures 11, 12, 13:
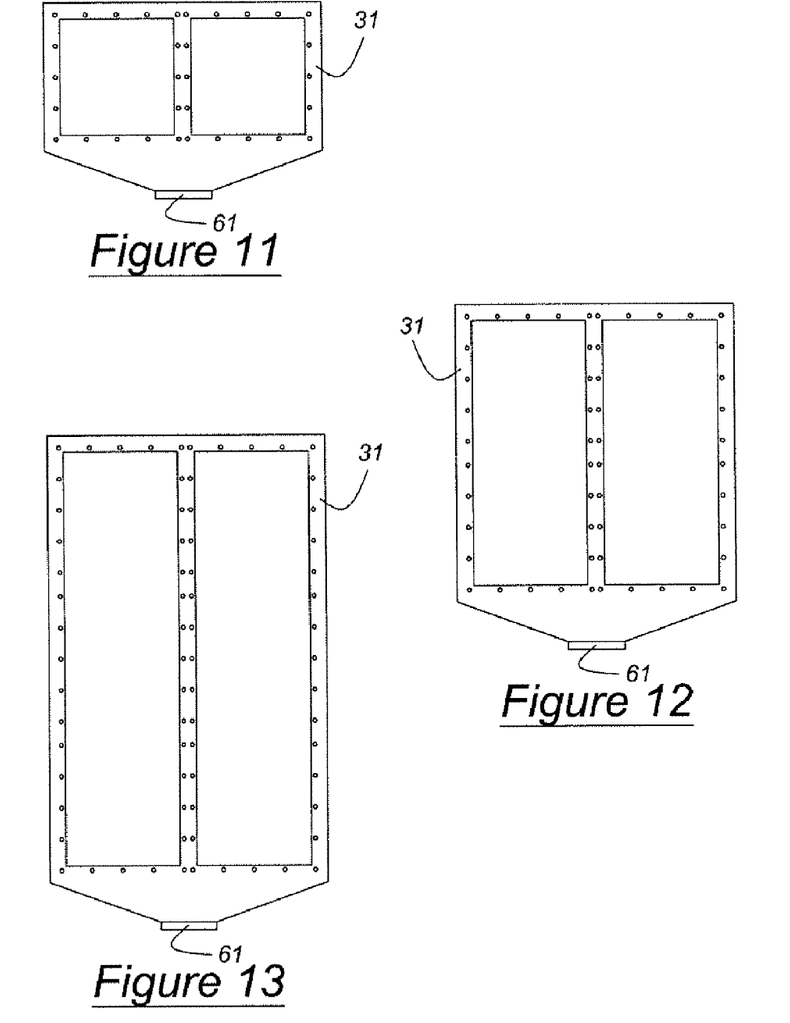
FIGS. 11 through 13 depict progressively larger filter frames that can accommodate an increased filtration area.

Of course, drag-out tanks are available in a variety of capacities and depths. FIGS. 11-13 depict progressively larger filter frames that can accommodate increased filtration area. For example, the frame of FIG. 11 is a single frame with four filter elements (two on each side), with each element being approximately 24 inches square. Because in a preferred embodiment each filter provides 4 square feet of filter surface, this is called a 16 square foot frame. FIG. 12 shows a four element frame with 32 square feet of filter surface, and FIG. 13 depicts a four-element frame with 48 square feet of filter surface.

Figure 14:
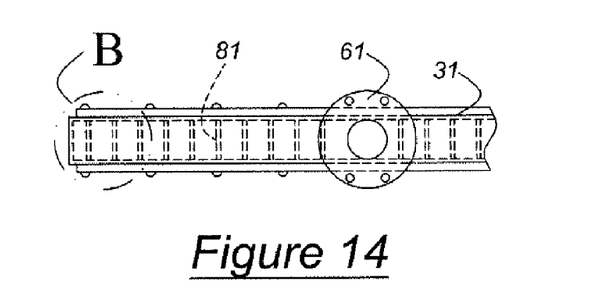
FIG. 14 is a bottom view of a portion of a filter frame showing the mounting flange and the placement of the internal support plates.
Figure 15:
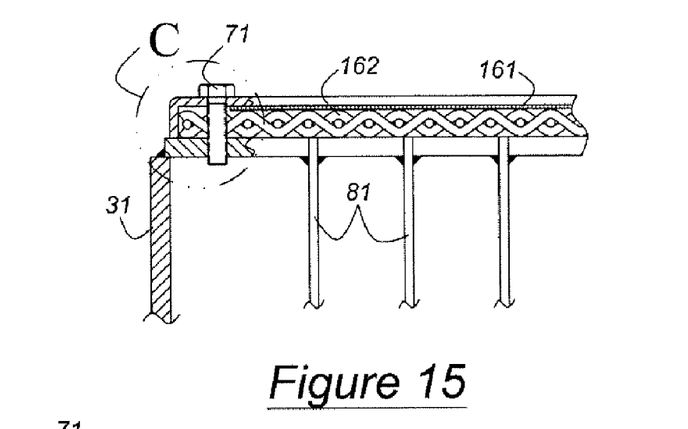
FIG. 15 is an enlarged view of area B from FIG. 14.
Figure 16:
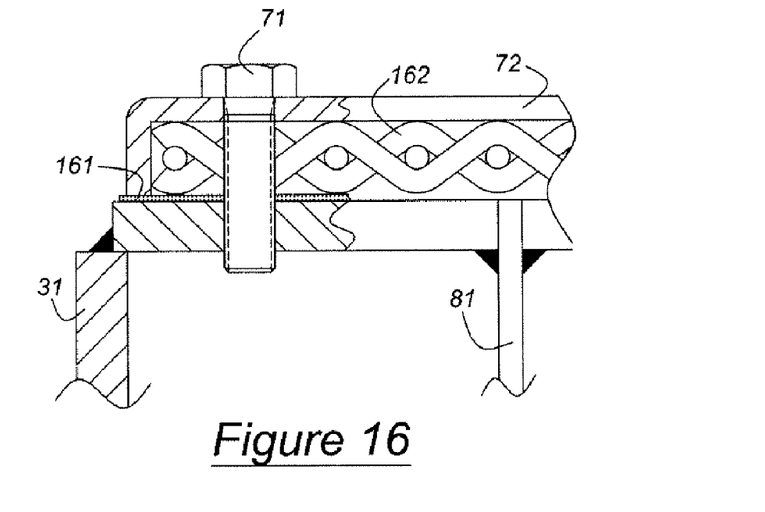
FIG. 16 is a further enlarged view of frame portion C from FIG. 15, indicating a sealing method that prevents any bypassing of unfiltered fluid.

FIG. 14 is a bottom view of a portion of a frame 31 showing mounting flange 61 and the placement of the internal support plates 81. Filter elements 161 and 162 are bolted to opposing faces of the frame 31 to form a panel filter having openings on two sides. FIG. 15 is an enlarged view of area B from FIG. 14. In this view, one can distinguish the individual components of a filter element 74 as a microscreen filter 161 affixed to a support mesh 162. FIG. 16 is a further enlarged view of frame portion C of FIG. 15. In this view, the bezel 72 that holds filter elements 161 and 162 in place can be seen, as well as mounting bolt 71.

Figure 17:
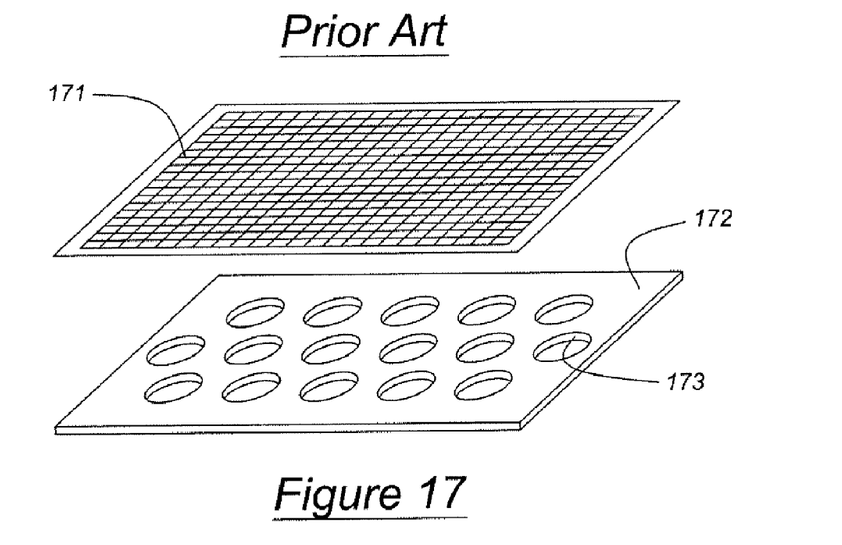
FIG. 17 depicts the components of a filter element of the prior art.

As shown in FIG. 17, prior art filter elements used in metalworking coolant filtration systems have generally been fabricated as a laminate of a microscreen filter material 171 fuse bonded to a nominal 0.100 inch thick stainless steel perforated sheet 172. The perforated sheet 172 has ⅜ inch diameter perforations, 173, staggered on centers of 7/16 and ½ inch, yielding an open effective area of approximately 51.6%.

Figure 18:
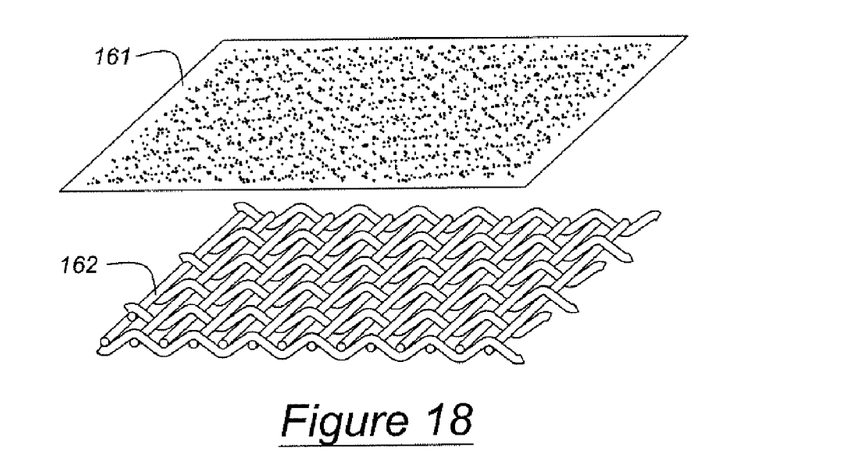
FIG. 18 depicts the components of a filter element in accordance with the present invention.

For a filter panel or element in accordance with the present invention, as depicted in FIG. 18, the replacement of the perforated sheet backing 172 (FIG. 17) with wire mesh screen 162 yields a substantial increase in effective area. This provides either increased performance or comparable performance in a smaller structure. For example, a 4×4 mesh stainless steel screen of 0.062 inch diameter wire yields, by contrast, approximately 95% open area. In a preferred embodiment, each of said microscreen elements 161 comprises a metallic sheet having a uniformly distributed plurality of openings, with each of the openings having a diameter ranging from about 0.005 inches to about 0.010 inches, and with the openings being disposed on centers of about 0.010 inches.

It should be noted that the prior art utilized primarily the following microscreen selections with their respective open areas. The following table (Table I) provides the resultant effective area of the prior art septum and the resultant effective area of the inventive filter.

TABLE I

| Microscreen .010 Pitch Oriented 90° Hole φ | % Open Area | % Open Area Prior Art Backing Plate ⅜ φ Holes on ½" Centers | Prior Art Resultant Open Area | % Open Area Improved Support 4 × 4 S/S Mesh | Inventive Resultant Effective Area |
|---|---|---|---|---|---|
| .005 | 13.2% | 52% | 6.86% | 95% | 12.54% |
| .006 | 14.6% | | 7.59% | | 13.87% |
| .007 | 19.8% | | 10.29% | | 18.81% |

Those skilled in the art will appreciate in view of this disclosure that the particular process utilized to affix microscreen 161 onto the mesh screen backing material 162 may vary based upon the material selection of the microscreen and the mesh backing. These processes may include spot welding, laser welding, brazing, fuse bonding, electron beam welding, soldering, or other bonding processes known to those skilled in the art and yield acceptable results and quality.

There has been described herein a filtration system that offers distinct advantages when compared with the prior art. It will be apparent to those skilled in the art that modifications may be made without departing from the spirit and scope of the invention.

What is claimed is:

1. A filtration system for metalworking fluids, comprising:
   a drag-out, coolant cleaning tank having a longitudinal axis;
   a mechanical conveyor system for removing solid contaminants from the tank, with said conveyor system being oriented for motion along said longitudinal axis of the tank;
   a pump system for removing clean coolant from the tank and for backflushing a filter system housed within said tank; and
   a filter system mounted within said tank, with said filter system having a plurality of panel filters for receiving dirty coolant from said tank and for providing clean coolant to said pump system, with said plurality of panel filters being generally parallel to each other and oriented at an acute angle to said longitudinal axis.

2. A filtration system according to claim 1, wherein said filter system comprises a plurality of receivers, with each of said receivers having a plurality of panel filters attached thereto, and with each of said receivers being connected to said pump system.

3. A filtration system according to claim 1, wherein each of said panel filters comprises a generally rectangular frame having a plurality of microscreen filter elements supported by a wire screen substrate.

4. A filtration system according to claim 3, wherein each of said microscreen elements is welded to a wire screen substrate.

5. A filtration system according to claim 4, wherein said microscreen is electron beam welded to said wire screen substrate.

6. A filtration system according to claim 4, wherein said microscreen is spot welded to said wire screen substrate.

7. A filtration system according to claim 3, wherein each of said microscreen elements comprises a metallic sheet having a uniformly distributed plurality of openings, with each of said openings having a diameter ranging from about 0.005 inches to about 0.007 inches, and with said openings being disposed on centers of about 0.010 inches.

8. A filtration system according to claim 7, wherein said microscreen filter elements and said substrates are each fabricated from stainless steel.

9. A filtration system for metalworking fluids, comprising:
   a drag-out, coolant cleaning tank having a longitudinal axis;
   a filter system mounted within said tank, with said filter system having a plurality of filter panels for receiving dirty coolant from said tank and for providing clean coolant to said pump system, with said plurality of panel filters being generally parallel to each other and oriented at an acute angle to said longitudinal axis;
   a pump system for removing clean coolant from the tank and for backflushing said filter system housed within said tank; and
   a mechanical conveyor system for removing solid contaminants from the tank and for causing unfiltered coolant to flow along said filter panels, with said conveyor system being oriented for motion along said longitudinal axis of the tank.

* * * * *